Figure 1:
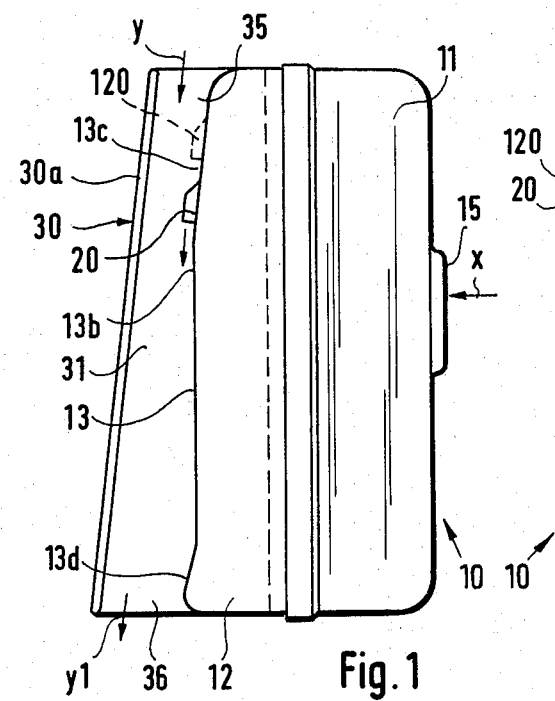

United States Patent [19]

Mäthner et al.

[11] 4,231,221
[45] Nov. 4, 1980

[54] EXHAUST SILENCER FOR EXHAUST SYSTEMS OF INTERNAL COMBUSTION ENGINES, PARTICULARLY INTERNAL COMBUSTION ENGINE-OPERATED MANUAL APPLIANCES

[75] Inventors: Manfred Mäthner, Hamburg; Peter Thomsen, Quickborn, both of Fed. Rep. of Germany

[73] Assignee: Dolmar Maschinenfabrik GmbH & Co., Hamburg, Fed. Rep. of Germany

[21] Appl. No.: 917,672

[22] Filed: Jun. 21, 1978

[30] Foreign Application Priority Data

Apr. 12, 1978 [DE] Fed. Rep. of Germany ... 7810865[U]

[51] Int. Cl.³ ............................ F01N 5/04; F01N 1/14
[52] U.S. Cl. ...................................... 60/319; 181/240; 181/262; 181/263; 417/179; 417/196
[58] Field of Search ............... 181/240, 262, 263; 417/159, 174, 179, 196, 198; 60/317, 319

[56] References Cited

U.S. PATENT DOCUMENTS

| | | | |
|---|---|---|---|
| 1,638,087 | 8/1927 | Clark | 181/263 |
| 2,975,854 | 3/1961 | Bakke | 181/240 |
| 3,371,618 | 3/1968 | Chambers | 417/196 |
| 3,494,296 | 2/1970 | Gluntz | 417/196 |
| 3,525,474 | 8/1970 | Ohain | 417/179 |
| 4,142,607 | 3/1979 | Landwehr | 181/240 |

FOREIGN PATENT DOCUMENTS

| | | | |
|---|---|---|---|
| 20392 | 9/1917 | France | 181/262 |
| 252546 | 6/1926 | United Kingdom | 181/263 |

*Primary Examiner*—Douglas Hart
*Attorney, Agent, or Firm*—Toren, McGeady and Stanger

[57] ABSTRACT

The invention relates to an exhaust silencer for internal combustion engines, particularly for manually operated appliances, in which a reduction of the contact and exhaust gas temperatures in order to prevent fire risks on contact with easily flammable objects, particularly forest fires, during the putting into operation of the manually operated appliance and with the supply of a large quantity of fresh air compared with the quantity of exhaust gas in order to bring about a maximum cooling of the hottest gases and/or the outer walls, is achieved in that the wall of the exhaust silencer shell portion which bounds the cooling pipe on one side, following the final outlet hood facing the pipe output port for deflecting the exhaust gas has a negative angular variation with an angle of approximately 2° to 8° for forming a pure or fluidic logic element.

8 Claims, 4 Drawing Figures

EXHAUST SILENCER FOR EXHAUST SYSTEMS OF INTERNAL COMBUSTION ENGINES, PARTICULARLY INTERNAL COMBUSTION ENGINE-OPERATED MANUAL APPLIANCES

The invention relates to an exhaust silencer for exhaust systems of internal combustion engines, particularly internal combustion engine-operated manual appliances, comprising two shell-like assembled portions with an inlet pipe connection connected to the outlet of the internal combustion engine and with one or more outlet ports provided on the silencer wall facing the inlet pipe connection and having exhaust gas-deflecting discharge hoods which laterally deflect the exhaust gases into an upstream cooling pipe with a discharge port widened in diffuser-like manner.

In the case of a manually operated appliance with an internal combustion engine the silencer is generally arranged in such a way that when operating the appliance it can easily come into contact with readily flammable grass, dry undergrowth, shavings and the like whereby the latter can burst into flame due to its high wall temperatures of approximately 320° to 380° C. and/or its waste gas temperatures of approximately 400° C. and above.

To prevent grass, undergrowth and dry wood catching fire it is necessary to reduce the contact temperatures on the walls and also the exhaust gas temperatures to such an extent that forest fires and other fire risks are prevented.

This temperature reduction is achieved in that the exhaust gases are mixed with ambient air. The Venturi principle provides a system which aids such a mixing without further energy costs, i.e. performance losses.

The problem of the present invention is to provide an exhaust silencer for internal combustion engines, particularly in the case of manually operated appliances, which leads to a reduction of the contact and exhaust temperatures in order to prevent fire hazards on contact with readily flammable objects, particularly forest fire risks during the putting into operation of the manually operated appliance, and in which, compared with the quantity of exhaust gas, there is a large fresh air supply in order to bring about a maximum cooling of the hot gases and/or the outer walls.

According to the invention, this problem is solved by an exhaust silencer for exhaust systems of internal combustion engines, particularly internal combustion engine-operated manual appliances of the type described hereinbefore which is characterized in that the wall of the silencer shell portion bounding the cooling pipe on one side, following the final discharge hood facing the pipe outlet port has a negative angular variation $\alpha$ with an angle of approximately 2° to 8° for forming a pure or fluidic logic element.

As a result of the construction of the exhaust silencer, the efficiency of the Venturi-like cooling pipe is significantly increased in that compared with the exhaust gas quantity a large quantity of fresh air is passed through the cooling pipe so that a very considerable cooling of the hot gases and/or the outer walls is achieved. In order to comply with the basic principles of injector action, it is achieved with the construction according to the invention that the hot gases escaping from the exhaust engage with the wall in laminar manner and consequently lead to the formation of a turbulence-free flow in the Venturi-like cooling pipe. The outlet ports in the shell portion wall of the exhaust silencer, which are constructed in slot-like manner, permit the escape of the exhaust gas parallel to the surface. So that this flow remains contiguous with the surface, the over-flowed surface area is inclined by approximately 2° to 8° and thus forms a pure or fluidic logic element ensuring the application of the flow. The laminar boundary layer can be destroyed by series-connected vortex barriers and is converted into a turbulent flow which leads to an intense mixing of the hot exhaust gases with the fresh air and consequently to a significant reduction in the contact and exhaust gas temperatures.

Further advantageous developments of the invention can be gathered from the dependent claims. One such construction is particularly advantageous and according to this each discharge hood covering the discharge port in the shell portion wall of the exhaust silencer zonally covers the shell portion wall following the outlet port, whereby the length of the covered part can be approximately 0.5 to 5 mm. As a result of this construction the exhaust gas jet is directed in a planned manner, and in particular when the inclination of the discharge hood surface amounts to up to approximately 3°, which is particularly advantageous from the flow standpoint.

Figure 2:
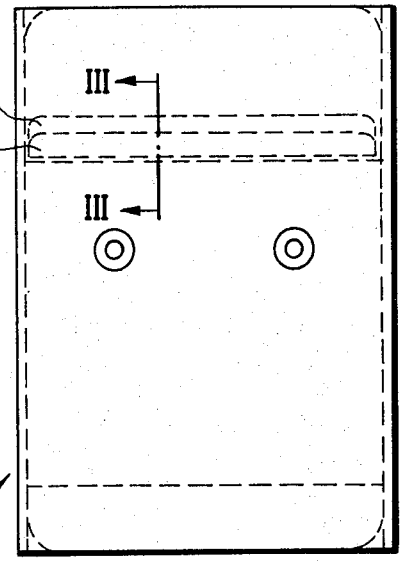
Figure 3:
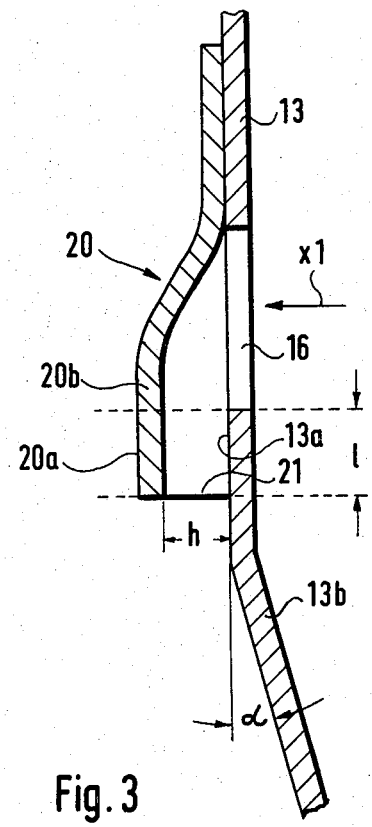
Figure 4:
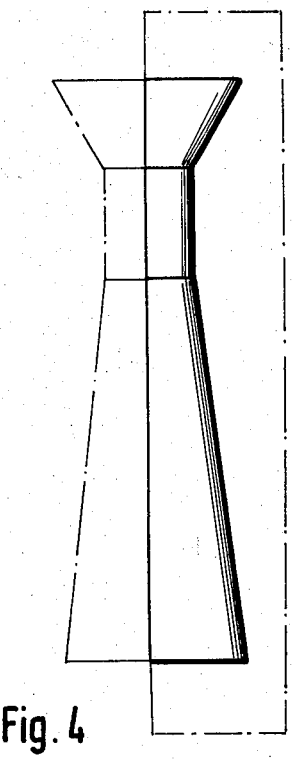

The invention is described in greater detail hereinafter relative to non-limitative embodiments and the attached drawings, wherein show:

FIG. 1, an exhaust silencer with a part Venturi-like cooling pipe, partly in side view and partly in vertical section;

FIG. 2, the exhaust silencer in a front view;

FIG. 3, an enlarged vertical section along the line III—III of FIG. 2;

FIG. 4, the usable surface line of a Venturi tube.

According to FIGS. 1 and 2, 10 is an exhaust silencer comprising two assembled shell portions 11,12. Shell portion 11 is provided with an inlet pipe connection 15 connected with the outlet of an internal combustion engine of a manually operated appliance, such as for example a motor operated chain saw (not shown in the drawing), and by means of which the exhaust gases are passed into the inner area of the silencer as indicated by the arrow X. The shell portion wall 13 of shell portion 12 facing the inlet pipe connection 15 has one or more discharge ports 16. A number of discharge hoods 20, 120 corresponding to the number of discharge ports is provided in the vicinity of the latter on wall 13. The exhaust gases passing into the inner area of silencer 10 flow through the discharge port 16 with a simultaneous alignment of the jet through discharge hoods 20,120 into a cooling pipe 31 provided laterally on silencer 10 and which is formed by a dome-shaped cover or closed shell 30. At the top shell 30 has an intake port 35 for the fresh air entering in the direction of arrow Y and on the side opposite to port 35 has an outlet port 36 for the exhaust gas/fresh air mixture flowing out in the direction of arrow $Y_1$. The outer side wall of shell 30 which limits the cooling pipe 31 is indicated at 30a (FIG. 1).

Shell 30 which is fixed to shell portion 12 is arranged in such a way that shell 30 together with the correspondingly shaped wall 13 of shell portion 12 forms the longitudinal part of a Venturi tube, so that cooling pipe 31 is constructed partly in Venturi-like manner, but only to the extent that this corresponds to the usable surface line of the Venturi tube shown in FIG. 4.

Shell portion 12 is covered by the laterally sealed shell 30 and thus forms part of a Venturi tube (FIG. 4). Whilst the wall 30a of shell 30 limiting the cooling pipe 31 is slightly outwardly inclined relative to the vertical of the silencer 10, wall 13 of shell portion 12 has the following configuration. Following a wall portion which initially runs almost parallel to wall 13a, there is after the final discharge hood 20 a longer angular wall portion 13b which runs almost parallel to the vertical surface line of silencer 10. On the pipe outlet side wall portion 13b passes into a wall portion 13d which tapers the wider pipe portion in the lower area of wall portion 13b.

A plurality of discharge ports can be provided in series on wall 13 of shell portion 12 enabling a maximum efficiency of the internal combustion engine to be achieved, so that at the same time the Venturi action is further increased. Each of the discharge ports 16 is provided with a hood-like cover for the formation of discharge hood 20 or 120.

As shown in FIG. 3, behind the final discharge hood 20 exhaust silencer wall 13 has a negative angular variation and thus forms a pure or fluidic logic element. This angular variation is indicated by the angle $\alpha$, which can preferably be 2° to 8°. In order that the exhaust gas jet is directed in a planned manner, each discharge hood 20 which covers the discharge port 16 in shell portion wall 13 covers with a section 20a the wall portion 13a of shell portion wall 13 following discharge port 16, so that section 20a of discharge hood top 20b always covers the wall portion 13a following discharge port 16 by the particular length corresponding to section 20a of discharge hood 20. The length l of the covered wall portion 13a preferably corresponds to 0.5 to 5 mm. A particularly favourable effect from the flow standpoint is obtained with an inclination of the hood top 20b of up to approximately 3°.

The height of the outlet port 21 formed by the discharge hood 20 approximately corresponds to the amount of the covered length of portion 13a of the top 20b of hood 20. Preferably the height h of discharge port 21 of discharge hood 20 is 0.5 to 3 mm.

If a plurality of discharge hoods 20,120 are provided on the shell portion wall 13, then all the hoods are preferably positioned in front of the angular variation $\alpha$ of shell wall 13 and/or in front of the end in the wall. To obtain a maximum Venturi cross-section and to prevent possible eddies at the edge, discharge port 16 and consequently discharge hoods 20 are provided over the entire width of the silencer. If such an arrangement is not possible corresponding fluidic surface inclinations can be provided laterally with respect to the discharge port 16.

The arrangement of discharge port 16 in conjunction with the construction of the discharge hoods 20 is such that the outflowing exhaust gas engages with wall 13 and this is aided by a possible inclination of the top of the hood.

We claim:

1. An exhaust muffler comprising first and second shell members connected to each other to form an inner region, an inlet formed on said first shell member for admitting exhaust gases from an internal combustion engine into said inner region, a number of discharge ports formed on a wall part of said second shell member which faces said inlet, a cover shell extending over the outside of said wall part of said second shell member for forming therewith an elongated cooling channel having an air inlet opening at one end and a diffusing outlet opening at the other end in the axial direction of said cooling channel, a discharge hood associated with each of said discharge ports for deflecting exhaust gases flowing out of said discharge ports from said inner region into said cooling channel in the direction of said diffusing outlet opening, said cover shell and said wall part together defining a Venturi tube in the longitudinal cross-section of said channel, said discharge hoods being arranged successively in the longitudinal direction of said cooling channel wherein said wall part deflects in the direction opposite from said cover shell by an angle ($\alpha$) of about 2° to 8° after the last successive one of said discharge hoods in the direction of said diffusing outlet opening of said channel for maintaining gas flow in said cooling channel contiguous to said wall part.

2. An exhaust muffler according to claim 1, wherein each of said discharge hoods has a deflecting surface which extends over an associated discharge port, said deflecting surface forming an angle of up to about 3° relative to the plane of said discharge port.

3. An exhaust muffler according to claim 1, wherein each of said discharge hoods has a surface section which covers a given length of said wall part following each said discharge port in the direction of said diffusing outlet opening of said channel.

4. An exhaust muffler according to claim 3, wherein said given length of said wall part is about 0.5 mm to 5 mm.

5. An exhaust muffler according to claim 3 or 4, wherein said surface section of said discharge hood is spaced from said given length of said wall part by a distance which is substantially equal to said given length.

6. An exhaust muffler according to claim 5, wherein said distance between said surface section and said given length of said wall part is about 0.5 mm to 3 mm.

7. An exhaust muffler according to claim 1, wherein each of said discharge ports is in the form of an elongated slot.

8. An exhaust muffler according to claim 1, wherein each of said discharge ports and their associated discharge hoods extend over substantially the entire width of said wall part transversely of the longitudinal axis of said channel.

* * * * *